US010356358B2

(12) United States Patent
Lynch et al.

(10) Patent No.: US 10,356,358 B2
(45) Date of Patent: *Jul. 16, 2019

(54) TRANSCODING AND CACHING FOR OFF AIR TELEVISION PROGRAMMING DELIVERY

(71) Applicant: DISH Technologies L.L.C., Englewood, CO (US)

(72) Inventors: Roger Lynch, Beverly Hills, CA (US); John Paul, Palo Alto, CA (US); Robert Drew Major, Orem, UT (US); David Kummer, Highlands Ranch, CO (US)

(73) Assignee: DISH Technologies L.L.C., Englewood, CO (US)

( * ) Notice: Subject to any disclaimer, the term of this patent is extended or adjusted under 35 U.S.C. 154(b) by 27 days.

This patent is subject to a terminal disclaimer.

(21) Appl. No.: 15/624,377

(22) Filed: Jun. 15, 2017

(65) Prior Publication Data

US 2017/0289496 A1    Oct. 5, 2017

Related U.S. Application Data

(63) Continuation of application No. 13/596,911, filed on Aug. 28, 2012, now Pat. No. 9,716,856.
(Continued)

(51) Int. Cl.
*H04N 5/91* (2006.01)
*H04N 9/79* (2006.01)
(Continued)

(52) U.S. Cl.
CPC .............. *H04N 5/91* (2013.01); *H04N 9/7921* (2013.01); *H04N 21/4263* (2013.01);
(Continued)

(58) Field of Classification Search
None
See application file for complete search history.

(56) References Cited

U.S. PATENT DOCUMENTS

| 6,985,190 B1 | 1/2006 | Klopfenstein et al. |
| 7,818,444 B2 | 10/2010 | Brueck et al. |
| | (Continued) | |

FOREIGN PATENT DOCUMENTS

| EP | 2823405 A2 | 1/2015 |
| EP | 3 300 355 A1 | 3/2018 |
| | (Continued) | |

OTHER PUBLICATIONS

Weber, Harold J. "Television remote controller utilizing a program provider's to select a channel number". Filed: Dec. 11, 2001. Issued: Jun. 6, 2006.*
(Continued)

*Primary Examiner* — William C Vaughn, Jr.
*Assistant Examiner* — Daniel Tekle
(74) *Attorney, Agent, or Firm* — Kilpatrick Townsend & Stockton LLP

(57) ABSTRACT

Techniques are disclosed for capturing, transcoding, and caching off-air programming at a location local to the consumer. According to certain embodiments, a device is provided that receives off-air (e.g., broadcast) and/or cable (e.g. ClearQAM) programming via one or more antennas and caches the programming in various streams having various bit rates for later viewing using, for example, Adaptive Bit Rate (ABR) streaming. Such a device can be incorporated in a larger system that can stream content via a data communication network (e.g., the Internet) and the device in a seamless manner. The device also can be controlled by a remote system via the data communication
(Continued)

network, and further can be configured to stream content to a remote device via the data communication network.

18 Claims, 8 Drawing Sheets

Related U.S. Application Data

(60) Provisional application No. 61/607,821, filed on Mar. 7, 2012.

(51) Int. Cl.
*H04N 21/426* (2011.01)
*H04N 21/433* (2011.01)
*H04N 21/4402* (2011.01)
*H04N 21/442* (2011.01)
*H04N 21/436* (2011.01)
*H04N 5/765* (2006.01)
*H04N 21/845* (2011.01)

(52) U.S. Cl.
CPC ..... *H04N 21/4331* (2013.01); *H04N 21/4334* (2013.01); *H04N 21/43615* (2013.01); *H04N 21/44029* (2013.01); *H04N 21/44209* (2013.01); *H04N 21/440218* (2013.01); *H04N 5/765* (2013.01); *H04N 21/8456* (2013.01)

(56) References Cited

U.S. PATENT DOCUMENTS

| | | | |
|---|---|---|---|
| 8,290,038 | B1 | 10/2012 | Wang et al. |
| 8,402,156 | B2 | 3/2013 | Brueck et al. |
| 8,370,514 | B2 | 5/2013 | Hurst et al. |
| 8,612,624 | B2 | 12/2013 | Brueck et al. |
| 8,683,066 | B2 | 3/2014 | Hurst et al. |
| 8,868,772 | B2 | 10/2014 | Major et al. |
| 8,880,721 | B2 | 11/2014 | Hurst et al. |
| 9,071,668 | B2 | 6/2015 | Brueck et al. |
| 9,716,856 | B2 | 7/2017 | Lynch et al. |
| 2002/0136231 | A1* | 9/2002 | Leatherbury ....... H04L 12/2801 370/442 |
| 2005/0160461 | A1 | 7/2005 | Baumgartner et al. |
| 2006/0026302 | A1 | 2/2006 | Bennett et al. |
| 2008/0162713 | A1 | 7/2008 | Bowra et al. |
| 2008/0270933 | A1 | 10/2008 | Straw et al. |
| 2008/0301746 | A1 | 12/2008 | Wiser et al. |
| 2008/0301750 | A1 | 12/2008 | Silfvast et al. |
| 2009/0138907 | A1 | 5/2009 | Wiser et al. |
| 2010/0031162 | A1 | 2/2010 | Wiser et al. |
| 2010/0142597 | A1 | 6/2010 | Zhang et al. |
| 2010/0325666 | A1 | 12/2010 | Wiser et al. |
| 2011/0143667 | A1* | 6/2011 | Cugnini ............. H04N 21/6131 455/41.2 |
| 2011/0307929 | A1 | 12/2011 | Youssefmir et al. |
| 2011/0307942 | A1 | 12/2011 | Youssefmir et al. |
| 2012/0002000 | A1 | 1/2012 | Guerrero |
| 2012/0002717 | A1 | 1/2012 | Ma et al. |
| 2012/0005705 | A1 | 1/2012 | Youssefmir et al. |
| 2012/0044426 | A1 | 2/2012 | Ross et al. |
| 2012/0047535 | A1 | 2/2012 | Bennett et al. |
| 2012/0141089 | A1* | 6/2012 | Hunt ................ H04N 21/23439 386/239 |
| 2012/0314761 | A1 | 12/2012 | Melnyk et al. |
| 2013/0236158 | A1 | 9/2013 | Lynch et al. |
| 2014/0233923 | A1 | 8/2014 | Bradley et al. |
| 2014/0270713 | A1 | 9/2014 | Hybertson |
| 2015/0042882 | A1 | 2/2015 | Park et al. |
| 2016/0205420 | A1 | 7/2016 | Ellis et al. |
| 2016/0255397 | A1 | 9/2016 | Langan et al. |
| 2018/0131990 | A1 | 5/2018 | Desclos et al. |

FOREIGN PATENT DOCUMENTS

| | | |
|---|---|---|
| WO | 2013/134006 A2 | 9/2013 |
| WO | 2017/000751 A1 | 1/2017 |

OTHER PUBLICATIONS

Supplementary European Search Report for EP 13757042 dated Nov. 26, 2015, all pages.
Office Action for EP 13757042 dated Jun. 6, 2017, all pages.
International Search Report and Written Opinion for PCT/US2013/027612 dated May 10, 2013, all pages.
International Preliminary Report on Patentability for PCT/US2013/027612 dated Oct. 14, 2014, all pages.
U.S. Appl. No. 15/856,705, filed Dec. 28, 2017 Non-Final Rejection dated Feb. 6, 2019, all pages.
International Search Report and Written Opinion for PCT/US2018/065489 dated Mar. 19, 2019, all pages.

* cited by examiner

TRANSCODING AND CACHING FOR OFF AIR TELEVISION PROGRAMMING DELIVERY

CROSS-REFERENCES TO RELATED APPLICATIONS

The present application is a continuation of U.S. Nonprovisional application Ser. No. 13/596,911, filed on Aug. 28, 2012, which is a non-provisional patent application claiming the benefit of priority of U.S. Provisional Application No. 61/607,821, filed on Mar. 7, 2012, which are hereby incorporated by reference in their entireties for all purposes.

BACKGROUND

Current data networks and personal electronic devices enable a consumer to receive television programming using any of a variety of electronic devices, such as smart phones, tablets, laptops, gaming consoles, set-top boxes, and the like. Problematically, however, data service providers (e.g., Internet providers) often throttle or cap the data plans used to deliver television programming after certain data limits have been reached, after which the consumer may not be able to stream television programming. And because television programming can involve high amounts of data, these data limits can be reached quickly.

SUMMARY

Techniques are disclosed for capturing, transcoding, and caching off-air (e.g., broadcast) and/or cable (e.g., ClearQAM) programming at a location local to the consumer. According to certain embodiments, a device is provided that receives off-air (e.g., broadcast) programming via one or more antennas and caches the programming in various streams having various bit rates for later viewing using, for example, Adaptive Bit Rate (ABR) streaming. Such a device can be incorporated in a larger system that can stream content via a data communication network (e.g., the Internet) and the device in a seamless manner. The device also can be controlled by a remote system via the data communication network, and further can be configured to stream content to a remote device via the data communication network.

According to one embodiment described herein, an apparatus for delivering television programming can include one or more television tuners communicatively connected with one or more antennas, a memory, and a communication interface. The apparatus can further include a processing unit communicatively coupled with the one or more television tuners, the memory, and the communication interface. The processing unit can be configured to receive, via the communication interface, information corresponding to certain television programming, receive, from the one or more antennas via the one or more television tuners, a stream of the certain television programming, and transcode or encode the stream of the certain television programming into a plurality of video streams based, at least in part, on the information corresponding to the certain television programming. Each of the plurality of video streams includes a different bit rate. The processing unit is further configured to store the plurality of video streams in the memory, receive a first request for the certain television programming, and provide, via the communication interface, at least a portion of a first video stream of the plurality of video streams.

Embodiments of the apparatus for delivering television programming can include one or more of the following features. The one or more television tuners can be configured to be communicatively connected with a plurality of antennas, and the processing unit can be further configured to determine a certain antenna to use to receive the certain television programming based on at least one of a signal strength associated with the certain antenna, or a channel associated with the certain television programming. The processing unit can be configured to receive a plurality of streams of different television programming at the same time. The processing unit can be configured to transcode or encode the plurality of streams at the same time. The processing unit can be configured to store each of the plurality of video streams as a plurality of streamlets. The plurality of streamlets for each of the plurality of video streams can be stored in a separate folder in the memory According to another embodiment described herein, a method for delivering television programming can include receiving, via a communication interface, an instruction to record a certain television programming; receiving, with one or more antennas, a broadcast signal of the certain television programming; and transcoding or encoding the certain television programming into a plurality of video streams. Each of the plurality of video streams can include a different bit rate. The method further can include storing the plurality of video streams; receiving a first request to stream the certain television programming; and streaming, via the communication interface, at least a portion of a first video stream of the plurality of video streams.

Embodiments of the method for delivering television programming can include one or more of the following features and/or processes. Determining a connection speed to a device to which the first video stream is streamed, and selecting the first video stream based, at least in part, on the connection speed. Determining a first type of device associated with the first request, and selecting the first video stream based, at least in part, on the first type of device. Receiving a second request for the certain television programming, determining a second type of device associated with the second request, and streaming, via the communication interface, at least a portion of a second video stream of the plurality of video streams. Detecting a change a connection speed to a device to which the first video stream is streamed, and streaming, via the communication interface, at least a portion of a second video stream of the plurality of video streams based, at least in part, on the detected change in the connection speed. Determining a certain antenna to use to receive the certain television programming based on at least one of a signal strength associated with the certain antenna, or a channel associated with the certain television programming. Each of the plurality of video streams can comprise a series of streamlets According to yet another embodiment described herein, a system for delivering television programming can include tuning means for receiving a broadcast signal of a certain television programming, and processing means for transcoding or encoding the certain television programming into a plurality of video streams. Each of the plurality of video streams can include a different bit rate. The system also can include storing means for storing the plurality of video streams, and communication means for receiving an instruction to record the certain television programming, receiving a first request to stream the certain television programming, and streaming at least a portion of a first video stream of the plurality of video streams.

Embodiments of the system for delivering television programming can include one or more of the following features. The processing means can be configured to determine a first type of device associated with the first request, and select the first video stream based, at least in part, on the first type of device. The processing means can be configured to determine a second type of device associated with a second request, and the communication means can be configured to stream at least a portion of a second video stream of the plurality of video streams. A remote server can be configured to communicate to the communication means, via the Internet, the instruction to record the certain television programming. The remote server can include means for receiving a request to record the certain television programming, and determining the tuning means is capable of receiving the broadcast signal of the certain television programming.

According to yet another embodiment of the present invention, a system for delivering television programming can include a local streaming component configured to capture a broadcast signal, transcode or encode the broadcast signal into a first plurality of video streams, store the first plurality of video streams, and stream at least a portion of the first plurality of video streams to a device via a local data network. The system can also include a remote streaming component configured to store a second plurality of video streams, and stream at least a portion of the second plurality of video streams to the device from a remote location via the Internet.

Embodiments of the system for delivering television programming can include one or more of the following features. A content manager configured to receive a request to stream the television programming to the device, and determine which of the first plurality of video streams or second plurality of video streams corresponds to the television programming. The content manager can be configured to communicate with the device via the Internet or other appropriate data network. A content manager can be configured to receive a request to record the television programming, determine that the television programming can be recorded with the local streaming component, and send a message to the local streaming component to record the television programming. The local streaming component and the remote streaming component can be configured to stream the at least a portion one or more video streams to the device via the Internet when the device is not connected to the local data network.

According to yet another embodiment described herein, a method for recording television programming for subsequent streaming can include receiving, via a communication interface, an instruction to record a certain television programming; receiving, with one or more antennas, a broadcast signal of the certain television programming; and transcoding or encoding the certain television programming into a plurality of video streams. Each of the plurality of video streams can include a different bit rate. The method can further include storing the plurality of video streams, and sending, via the communication interface, at least a portion of a first video stream of the plurality of video streams to a central storage device.

Numerous benefits are achieved over conventional techniques. For example, by bypassing the Internet by capturing and streaming off-air content, the amount of television programming streamed through a data plan can be reduced. This reduces the likelihood that the consumer will reach a data limit, creating a better consumer experience. Additionally, by utilizing ABR techniques to stream cached video content, the video streamed to a particular device can be adjusted to ensure the maximum customer experience with the particular device for a given connection. These and other embodiments, along with many of its advantages and features, are described in more detail in conjunction with the text below and attached figures.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It will be understood that various changes may be made in the function and arrangement of elements without departing from the spirit and scope as set forth in the appended claims.

Although techniques described below are provided in terms of capturing and streaming television programming, the techniques may easily be utilized in other applications, such as capturing radio and/or other non-television, off-air signals. Additionally or alternatively, embodiments may include capturing television programming via a cable connection, such as ClearQAM. As such, the terms "broadcast signal," "television programming," "television program," and other such terms are meant to be illustrative to applications for capturing and streaming television programming, but not limiting as to embodiments for capturing and streaming other content.

Figure 1:
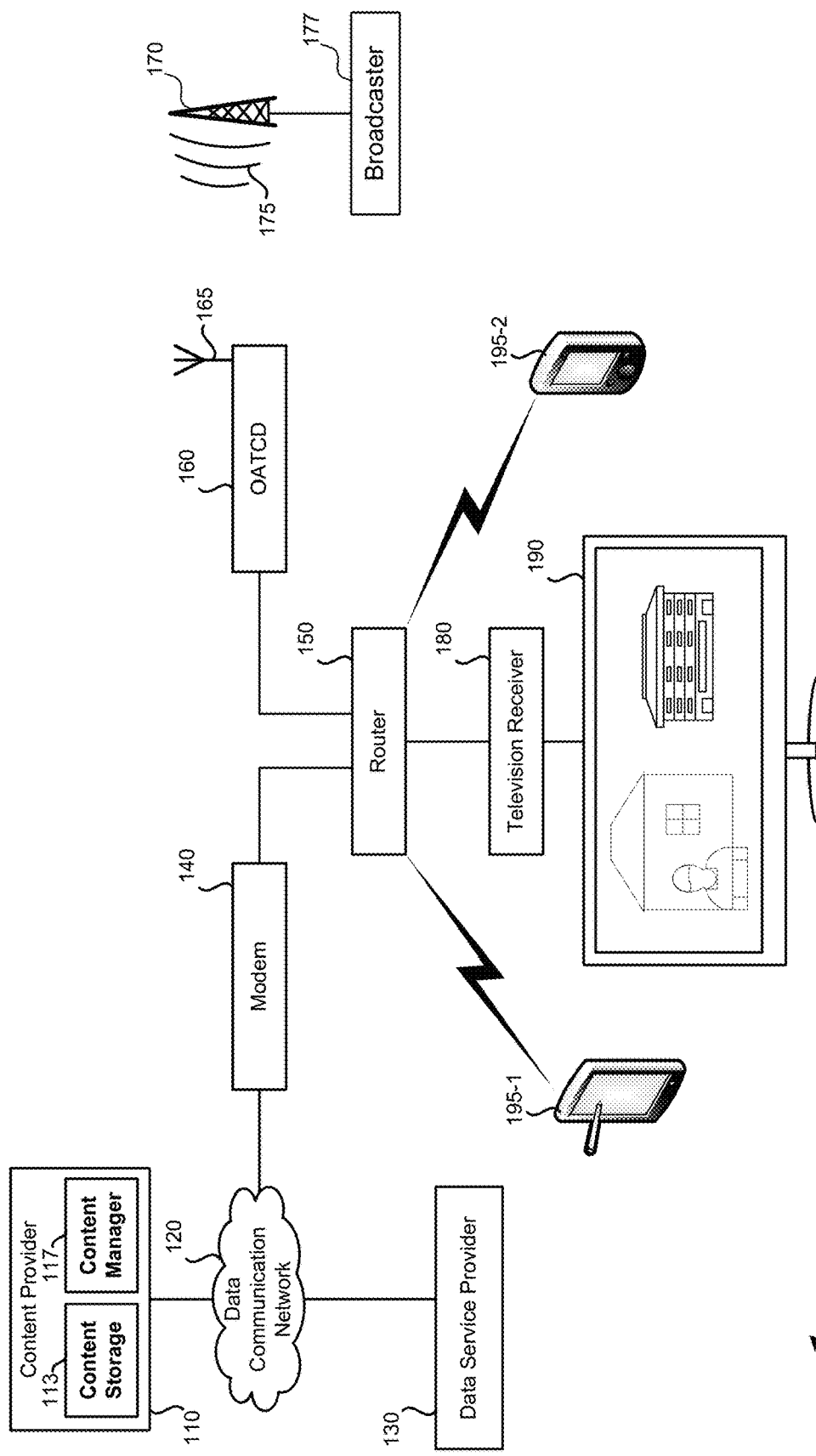
FIG. 1 is a block diagram of a content streaming system, according to one embodiment of the present invention.

FIG. 1 is a block diagram of a content streaming system 100, according to one embodiment. In this embodiment, the content streaming system 100 can stream content to a television 190, wireless devices 195, and/or other devices via a data communication network 120 and an Off-Air Transcoding and Caching Device (OATCD) 160. Such streaming can be managed remotely by a content manager 117, which can communicate with a television receiver 180, OATCD 160, and/or other devices to schedule content to record, manage the transcoding, caching, and streaming of content, and/or perform other functions to manage and administer content to a user. Alternate embodiments of the content streaming system 100 may include fewer or greater numbers of components. While only one television receiver 180 and television 190 are illustrated, it should be understood that multiple (tens, thousands, millions, etc.) instances of user equipment may be connected with the data communication network 120.

The content provider 110 can provide media and/or other content, in various forms, communicated via the data communication network 120. For example, content provider 110 may be a television service provider providing one or more television channels with television programming comprising audio and/or video that can be provided in multiple formats (e.g., standard definition and high definition). Additionally or alternatively, the content provider 110 can comprise a server providing streaming and/or downloadable media content, available on demand and/or in accordance with a programming schedule. In some embodiments, the content provider 110 can be and/or incorporate a content delivery network (CDN).

The data communication network 120 is the infrastructure by which the media is distributed for viewing. It can comprise any combination of a variety of data communication systems, for example, cable, satellite, wireless/cellular, or Internet systems, or the like, utilizing various transport technologies and/or protocols, such as radio frequency (RF), optical, satellite, coaxial cable, Ethernet, cellular, twisted pair, other wired and wireless technologies, and the like. The network type can comprise packet- and/or circuit-type switching, and can include one or more open, closed, public, and/or private networks, including the Internet, depending on desired functionality, cost concerns, and other factors. The data service provider 130 can be, for example, an Internet service provider that allows a modem 140 to send and/or receive data via the data communication network 120. The data service provider 130 may limit and/or throttle the amount of data downloaded by the modem 140.

The router 150 enables connected devices to communicate with each other by forming, for example, a local data network (e.g, a Local Area Network (LAN)). The router 150 additionally enables connected devices to send and/or receive data from the data communication network 120 via the modem 140. As such, the content provider 110 can communicate with some or all of the devices connected to the router 150. These devices can include the OATCD 160, television receiver 180, television 190, wireless devices 195 (such as tablet 195-1 and smart phone 195-2), and the like. In fact, a variety of electronic devices such as mobile phones, media players, personal computers, tablets, laptops, gaming consoles, etc. can be connected with the router 150 and configured to communicate with the content provider 110 and/or stream television programming.

The functionality and/or physical embodiment of the television receiver 180 also can vary in form and function. The television receiver 180 may be used to decode media video and/or audio received from the content provider 110 and/or the OATCD 160 for display on the television 190. (In other embodiments, an electronic display other than a television may be used.) In some embodiments the functionality and/or physical hardware of a television receiver 180 and/or OATCD 160 may be integrated into a television (e.g., "Smart TV"), computer, or other end-user display or presentation device. In other embodiments, the television receiver 180 may be a separate device, such as a set-top box or similar device, connected with the data communication network 120 and/or OATCD 160 through a communication interface, and connected with the television 190 through an output interface.

The television receiver 180 can be configured to cause the television 190 to display a menu, such as an electronic programming guide (EPG), that provides a consumer different options and functionality for viewing and/or recording media content. For example, the EPG can display a grid of current and/or future television programs that are available for recording, allowing the consumer to view the television programming at the consumer's convenience. Using a remote control or other input device, the consumer may select a program for recording. The selection is then sent to the content manager 117, which can schedule the recording. Other connected devices, such as wireless devices 195, can provide similar functionality using, for example, an Internet browser, client, or other software application.

After receiving the request to record a television program (or any television programming), the content manager 117 can determine whether the television program is available for recording with the OATCD 160 and/or content storage 113. As discussed earlier, the OATCD 160 is communicatively connected with the content manager 117. Thus, during an initial setup and/or periodically thereafter, the OATCD 160 can conduct a scan to determine which off-air programming is available. Off-air programming can include locally-broadcast television channels, sent by a broadcaster 177 via a transmission antenna 170, which transmits radio frequency (RF) signals 175 captured by one or more antennas 165 communicatively coupled with the OATCD 160. In certain embodiments, OATCD 160 may be attached to a cable connection in multi-unit housing (e.g., an apartment complex, condo, etc.), which may include basic cable as part of the rent or association fees. These basic channels can be received by OATCD (160) and complimented by additional programming from the content provider (110). The signals provided to OATCD (160) in these embodiments may be Clear QAM signals. If the content manager 117 determines the requested television program to record can be captured using the OATCD 160, the content manager 117 can schedule the recording accordingly. Depending on the functionality of the content streaming system 100, the schedule can be maintained by the content manager 117 (which could cause the OATCD 160 to record the requested television program at a corresponding broadcast time) and/or the OATCD (which could record the requested television program based on the locally-maintained schedule).

The content manager 117 can include additional functionality as well. For example, if the content manager 117 determines whether the television program is not available for recording with the OATCD 160, it can schedule a recording and/or obtain the desired program via other channels, such as satellite, cable, and/or Internet, and store the recording in content storage 113 (which may include storing multiple video streams (e.g., files) of the program, each with different bit rates for ABR streaming). The content manager 117 may also have access to certain account information associated with the OATCD 160, television receiver 180, and/or consumer to determine whether the requested program for recording is available for recording under a corresponding service plan. The content manager 117 can further track the location of the various stored television programs in the content storage 113 and/or OATCD 160 to provide a uniform resource locator (URL), pointer, and/or other information for streaming the recorded television programs. Therefore, in some embodiments, the content manager 117 can receive all requests from a consumer to view a recorded television program, where the request comes from customer input received by the television receiver 180 or other device connected to the router 150, and provide a corresponding URL and/or other streaming information to allow the customer to view the recorded television program on the requesting device. In some embodiments, the content manager 117 can display recorded programs via an EPG, application, browser, or other user interface on the requesting device.

In short, the OATCD 160 can comprise part of a larger content streaming system 100 enabling a seamless consumer experience between devices and/or content. The OATCD 160, for example, can be managed remotely by a centralized and/or cloud-based content manager 117. The content manager 117 can be used to set up timers/recordings on the OATCD 160 and content storage 113, and can utilize the OATCD 160 and content storage 113 to provide the consumer with recorded television programming upon request. Furthermore, when a consumer is not at home (e.g., is using a device not connected with the router 150), the consumer still may access the consumer's OATCD 160 via the data communication network 120, in which case the OATCD 160 can upload recorded television programming to the consumer's device via the Internet.

In some embodiments, OATCD 160 can be configured to upload recorded television programming to the content storage 113 and/or another central storage device (which can be at a location remote from the OATCD 160). The uploading can occur in either real time, or non-real time, as desired. Such functionality can allow the OATCD 160 to provide a high bit rate video stream to the content manager 117 for playback of the television programming over the Internet at higher rates than achievable using other techniques. The OATCD 160 can be configured to prioritize which recorded television programming to upload based on viewership, series recordings, and/or other information provided by a user and/or the content manager 117.

The content manager 117, content storage 113 and/or other components of the content provider 110 can be implemented in software and/or hardware and located on one or more computer systems, such as those described in relation to FIG. 6 below. Moreover, depending on desired functionality and infrastructure concerns, these one or more computer systems may be located at different facilities, such that the content provider is a cloud-based system formed from a networked of communicatively connected components.

Numerous alterations can be made to the embodiment of the content streaming system 100 shown in FIG. 1. In some embodiments, for example, the router 150 may be omitted, and the OATCD 160 can connect directly with the television receiver 180 and/or modem 140. In other embodiments, the router 150 may be integrated into the OATCD 160, modem 140, and/or television receiver 180. Embodiments may include a content manager local to the OATCD 160, which can be executed in hardware and/or software built in to the OATCD 160, television receiver 180, or other device. Embodiments may also enable the OATCD (160) and/or television receiver (180) to be connected into the home network wirelessly using IEEE 802.11X protocols similar to devices 195-1 and 195-2. A person of ordinary skill in the art will recognize many alterations, substitutions, and other modifications.

Figure 2:
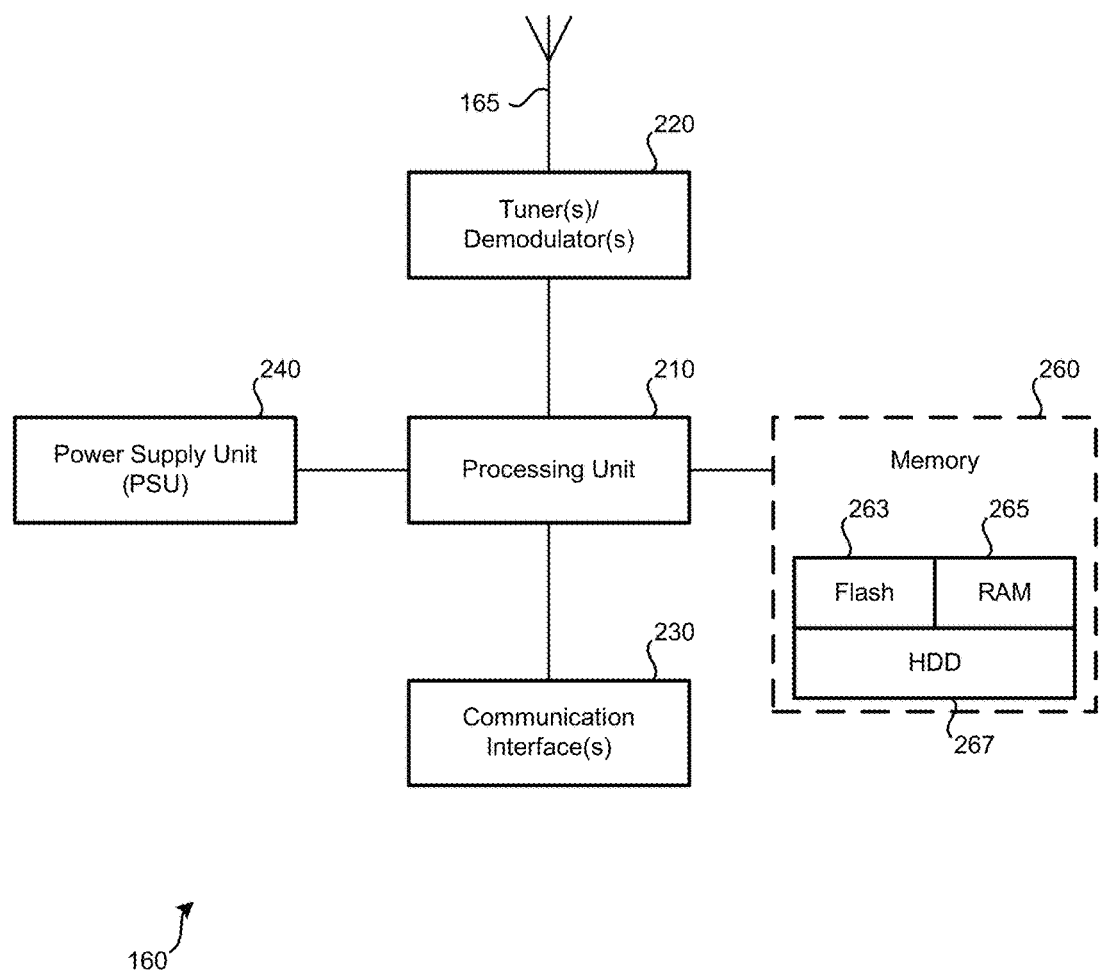
FIG. 2 is a simplified block diagram of components of an Off-Air Transcoding and Caching Device (OATCD), according to one embodiment.

FIG. 2 shows a simplified block diagram of components of an OATCD 160. OATCD 160 may be a stand-alone unit as shown in FIG. 1, or may be incorporated into a television receiver 180, DVR, television receiver, computer, media center or other device. OATCD 160 may include: a processing unit 210, tuner(s)/demodulator(s) 220, communication interface(s) 230, memory 260, and/or a power supply unit (PSU) 240. In other embodiments of the OATCD 160, fewer or greater numbers of components may be present.

Processing unit 210 may include one or more general-purpose processors, application-specific integrated circuits (ASICs), or other processing devices configured to perform processes such as decoding, encoding, and/or transcoding a received video signal for later viewing by a consumer. Transcoding can convert content into forms acceptable to certain devices such as 195-1 and 195-2, as well as lower storage and bandwidth requirements by converting older, less efficient compression technology (e.g., MPEG2) into an into a newer, more efficient compression technology (MPEG4), among other things. Decoding can be implemented in embodiments where, for example, functionality of a television receiver 180 is integrated into an OATCD 160, which is directly connected with the television 190. Tuner(s)/demodulator(s) 220 may include one or more tuners, coupled with one or more antennas 165, used to tune to and/or demodulate television channels. Among other things, this can enable simultaneous recording of programming from different television channels. For instance, one television tuner may be used to tune to a first channel for recording at the same time another tuner is used to tune to a second television channel for recording, thereby enabling the OATCD 160 to capture and transcode a plurality of streams of different television programming at the same time.

Where multiple antennas 165 are used, the OATCD 160 can be configured to determine which antenna to use for a particular recording. For example, the processing unit 210 can be configured to scan one or more television channels with each of the multiple antennas 165 to determine which of the antennas provide a better signal quality for a particular channel. When a program is scheduled for recording on the particular channel, the antenna with the best signal can be used for the recording.

The communication interface(s) 230 may be used to communicate to wireless devices 195, television 190, and other local devices, as well as to the content provider 110 and/or other remote systems and devices. As such, the communication interface(s) 230 may be configured to communicate via one or more local and/or remote data networks, such as the Internet. Information may be transmitted and/or received via the communication interface(s) 230. The communication interface(s) 230 can include wireless (e.g., IEEE 802.11a/b/g/n) and/or wired (e.g., 10/100/1000 Ethernet, USB, etc.) technologies, which may allow the OATCD 160 to communicate with a device directly and/or via a network.

Memory 260 may represent one or more types of non-transitory computer readable storage media, which can be used as working memory for the processing unit 210, storage for an operating system and/or other software for the processing unit 210 to execute, and/or cache for storage of video streams. For example, the memory can include volatile memory such as RAM 265 to function as working memory, while non-volatile memory such as flash 263 and/or hard disk drive can be used to store software, scheduled recordings, video streams, and the like. In some embodiments, all or a portion of the memory 260 may be provided in an internal, external, and/or network connected storage medium, such as a hard drive or solid state memory device.

While the OATCD 160 can be located, for example, in a basement or attic near the router 150 and/or modem 140, the OATCD 160 may be initially coupled to a television receiver 180, computer, or other device for setup. Setup can allow a consumer, installer, and/or other person to provide customized information, such as network settings for connecting with a router 150. Additionally or alternatively, the OATCD 160 can provide a browser-based settings page to allow a user to provide this information via a browser on another device connected with the router 150, such as a computer, smart phone, etc. After initial setup, the OATCD 160 can be controlled by the content manager 117, which can provide settings changes, firmware (software) updates, and the like to the OATCD 160. In some embodiments, television receiver 180 and/or devices 195-1 and 195-2 may be configured to communicate with the OATCD 160 to provide and/or contribute to the setup of the OATCD 160. For example, OATCD may be plugged into Ethernet and discovered using UPnP by these applications, including setting a WPA (or other wireless) key if the OATCD 160 is intended to be attached to the wireless network. Additionally or alternatively, a device such as a cell phone 195-2 or tablet 195-1 could join an open wireless network provided by default from OATCD 160, where upon it can be setup to join the home wireless network by providing the WPA key or other parameters.

When a television program is scheduled for recording the OATCD 160 can utilize the one or more antennas 165, tuner(s)/demodulator(s) 220, processing unit 210, and memory 260 to capture off-air programming and concurrently or subsequently transcode or encode and cache multiple video streams having different resolutions and/or different bit rates. For example the OATCD 160 can take a 18 Mbps MPEG-2 of-air signal and transcode the signal to create multiple video streams having different resolutions (e.g., 1080i, 720p, 720i, 480p, 480i, 240p, etc.) and/or bit rates (e.g., 6 Mbps, 3 Mbps, 2 Mbps, 1 Mbps, 500 kbps, 250 kbps, etc.). Depending on the functionality of the processing unit 210, this can occur in real time, as the program is being recorded, and/or at the time of playback. Alternatively, as indicated below, a single, high-bitrate video stream may be stored and subsequently transcoded during playback to a requested bit rate.

With television programming stored or at playback transcoded as multiple video streams of different bit rates, the OATCD 160 can provide adaptive bit-rate (ABR) streaming to any of a variety of personal electronic devices communicatively connected with the OATCD 160 via, for example, the router 150. Using its processing unit 210 and communication interface(s) 230, the OATCD 160 can determine a type of device to which a video is to be streamed by determining a device having a particular browser, operating system, application, processor, display resolution, and/or other hardware and/or software features of the device. The OATCD 160 also can determine a connection speed available for streaming the requested video to the device. Based on at least some of this information, the OATCD 160 can provide a video stream with a resolution and/or bit rate adapted to the device and connection speed used. Additionally or alternatively, the OATCD 160 or Content Manager 117 can publish what resolution and or rates are available, in which case the device, such as 195-1 or 195-2, can determine and request the rates and/or resolutions that are appropriate.

For example, at a consumer's home the OATCD 160 can be communicatively connected to a consumer's local area network (LAN), providing television programming to one or more personal electronic device communicatively connected to the LAN. The number of tuner(s)/demodulator(s) 220 in the OATCD 160 can dictate how many off-air channels can be transcoded and cached simultaneously. Furthermore, multiple processing units 210 may be integrated into an OATCD 160 and/or multiple OATCD 160 devices can be utilized to increase these transcoding and caching capabilities. In accordance with various embodiments, an OATCD 160 may be configured to selectively record television programming according to various user criteria, such as selected shows. In other embodiments, an OATCD 160 may be configured to record television programming within specified timer period, such as a primetime viewing block (e.g., 7:00 to 10:00 Mountain time) on one or more channels. Yet other embodiments may keep a running cache for some channels (e.g., recordings of all programs on a particular channel for the last 12 hours, 24 hours, 48 hours, etc.).

ABR streaming can be used to help ensure a quality playback experience for a certain personal electronic device under network conditions that may alter the bandwidth of the connection during playback of the video. Such ABR streaming can be implemented using various technologies such as Real-Time Messaging Protocol (RTMP) and/or Hypertext Transfer Protocol (HTTP) streaming. In HTTP streaming, for example, uniform resource locators (URLs) are provided to the personal electronic device indicating the data locations of particular portions of video content. Different URLs can correspond to different bit rates, resolutions, or qualities, of the same video content. As discussed earlier, all or a portion of recorded content may be stored in various bit rate streams, which can be stored in the OATCD 160 and or content storage 113 of the content provider 110 and accessed using different URLs. Thus, upon determining a different quality is needed according to an implementation of ABR streaming (for example, when a connection speed increases/decreases), different URLs can be requested and provided to and/or used by the device to which the video is streamed while the video is streaming to alter the quality of the video accordingly. Thus, ABR streaming can help ensure that the best-quality video stream is used for viewing a particular video, given a particular device type and/or connection speed. The processing unit 210 of the OATCD 160 and/or content provider 110, as well as the software in the client device (180, 195-1, 195-2), can be configured to implement such ABR streaming.

Techniques for monitoring and controlling the ABR streaming can include, for example, calculating connection performance based on the time in which one or more portions of a video stream is received. If the performance is determined to be above or below a certain threshold, a higher- or lower-quality video stream can be used accordingly. In some embodiments, a determination may be made whether streaming of a higher-quality video stream can be sustained. This process can be repeated continuously or as needed, while the video is streamed. In some embodiments, different hardware and/or software components can be implemented on the device and/or the OATCD 160 to request cached portions of a video stream, determine whether a higher- or lower-quality video stream should be streamed, and arrange the portions of the video stream in proper order for playback.

Creating the various video streams for ABR streaming can include processing each video stream into a series of "streamlets," or small portions of a video stream. Each streamlet of video can include, for example, 2 seconds of video and/or audio data. Depending on the desired functionality, the length of the streamlets can vary (e.g., 0.5, 1, 2, 3, 4, 5, 10, or 20 seconds, etc.). In some embodiments, a single video stream may include streamlets of different lengths. Once the streamlets for each media stream are created, they can be stored and served separately. The separate streamlets then can be served and played back, in sequence, to recreate the video.

Because streamlets can be stored as separately-addressable files in a data file system, the streamlets for different video streams can be organized and stored to facilitate ABR streaming. In one embodiment, for example, the streamlets for a particular video may be separated into different folders in a data file system—one folder for each video stream (e.g., a 6 Mbps folder, 3 Mbps folder, 2 Mbps folder, etc.). Furthermore, file names for streamlets may be numbered (or otherwise identified) in the same (or similar) manner for each folder. This can allow a system to easily switch between video streams during ABR streaming by selecting streamlets from a folder corresponding to a higher or lower bitrate, as appropriate. For example, a client device may begin to receive streamlets associated with a first video stream, and as the available bandwidth of the network changes, the client device may begin to receive streamlets from another video stream which has a higher or lower resolution. Thus, the client device may dynamically change the video stream accessed in real time due to changing network conditions. Other embodiments can include other types of numbering and/or storage schemes.

Utilizing ABR streaming can be beneficial for various reasons. Not only can ABR streaming provide a quality playback experience by reducing the likelihood of pausing playback to buffer video streams, but it also can help ensure the highest-quality sustainable video stream is used. Additionally, the use of HTTP-based ABR streaming allows the OATCD 160 to run a simple HTTP server software, which can be relatively cheap to license compared with other streaming solutions. That said, the techniques provided herein can be implemented in embodiments utilizing streaming methods other than ABR streaming.

Figure 3:
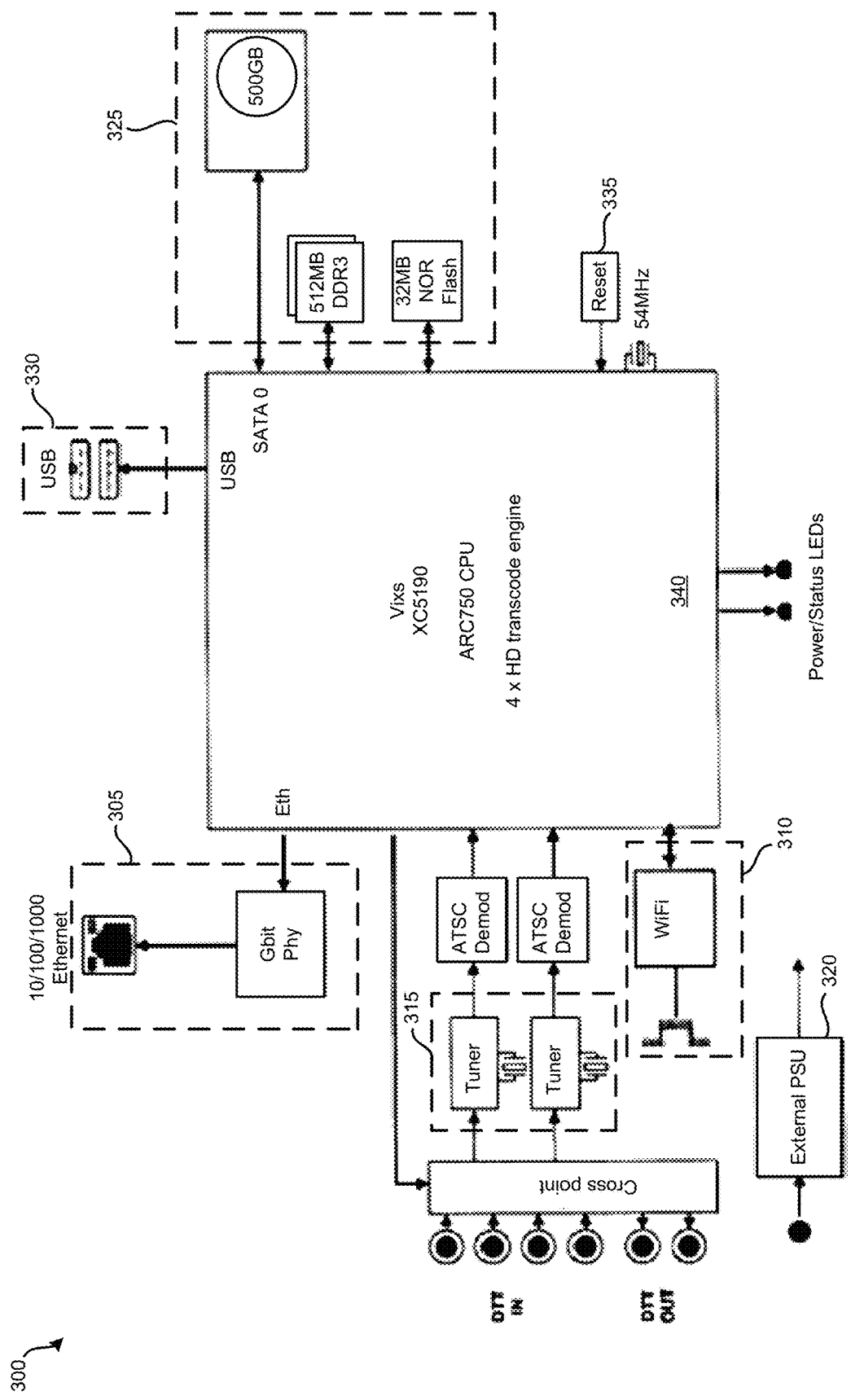
FIG. 3 is a block diagram of particular embodiment of an OATCD.

FIG. 3 is a block diagram of particular embodiment 300 of an OATCD. As shown, the embodiment 300 includes hardware components for Ethernet 305 and Wifi 310 network connectivity, tuners 315, external PSU 320, memory 325, USB port 330, reset button 335, among other components. Transcoding and other processing in this embodiment is performed by a processing unit 340, including a transcoding processor XC5190, made by ViXS Systems of Toronto (Ontario) Canada, which can include an ARC 750 processor core. Other contemplated embodiments include transcoders produced by other companies, such as Zennverge.

Figure 4A:
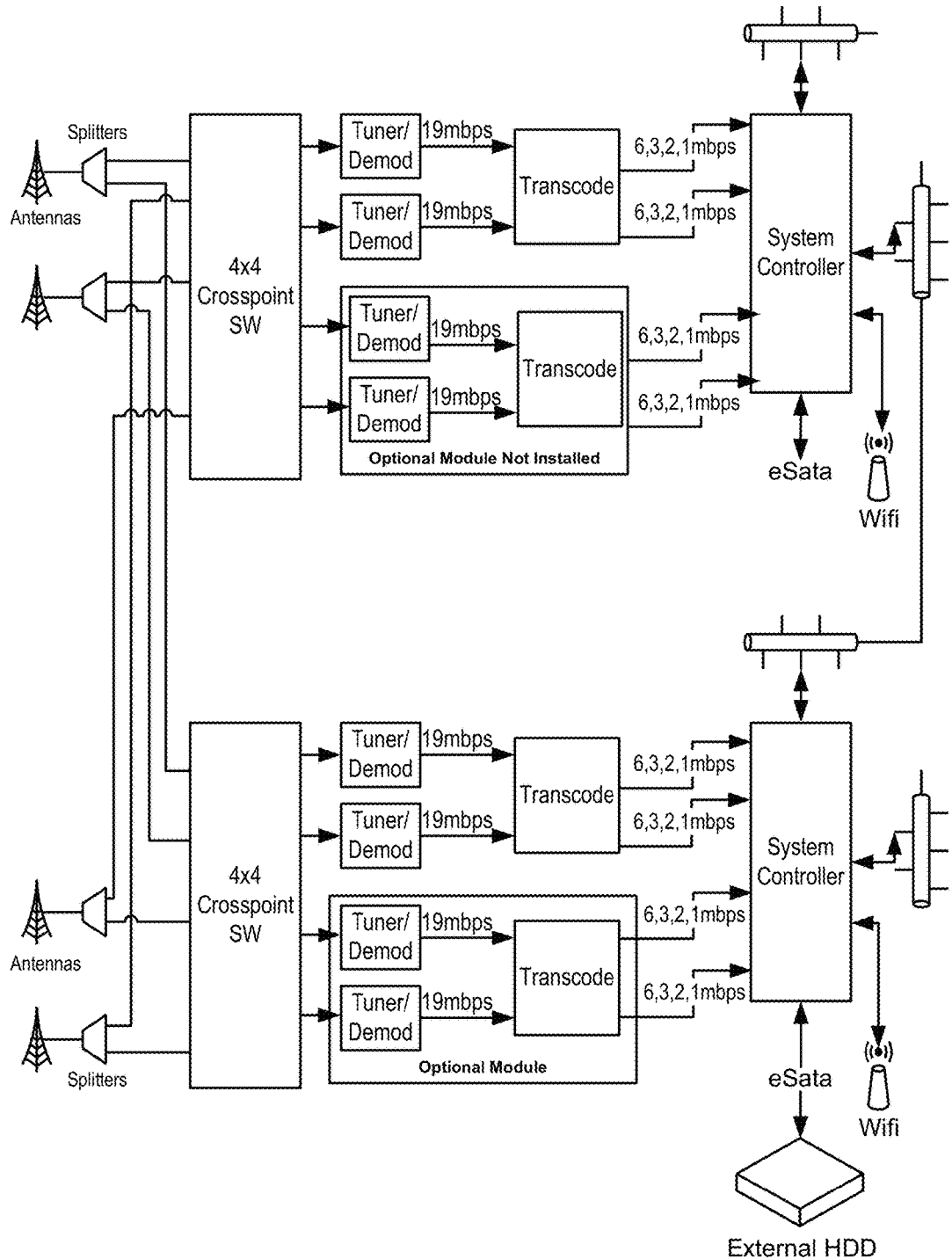
FIGS. 4A-4C are additional block diagrams illustrating how OATCDs may be utilized to scale up transcoding and/or streaming functionality, according to certain embodiments.
Figure 4B:
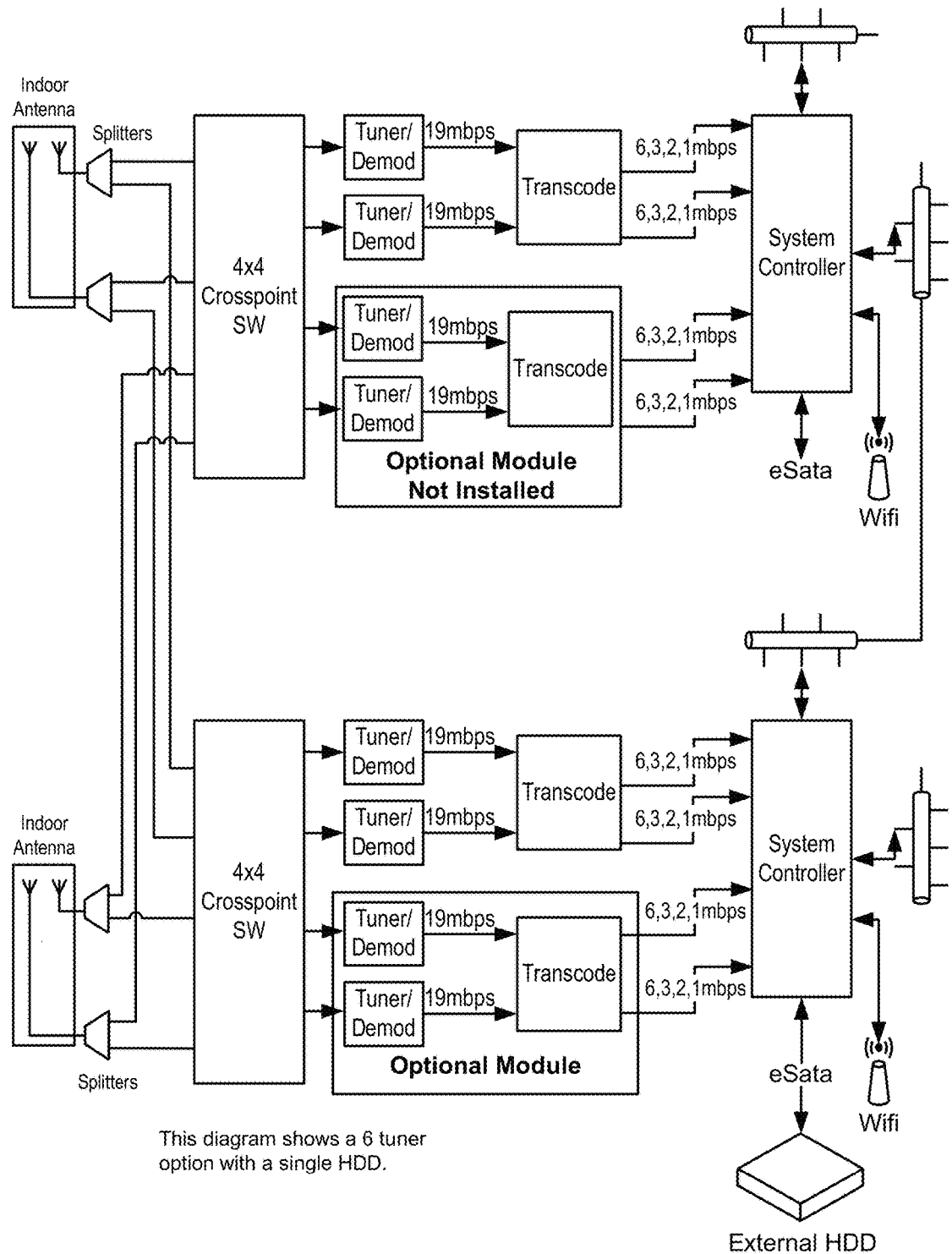
Figure 4C:
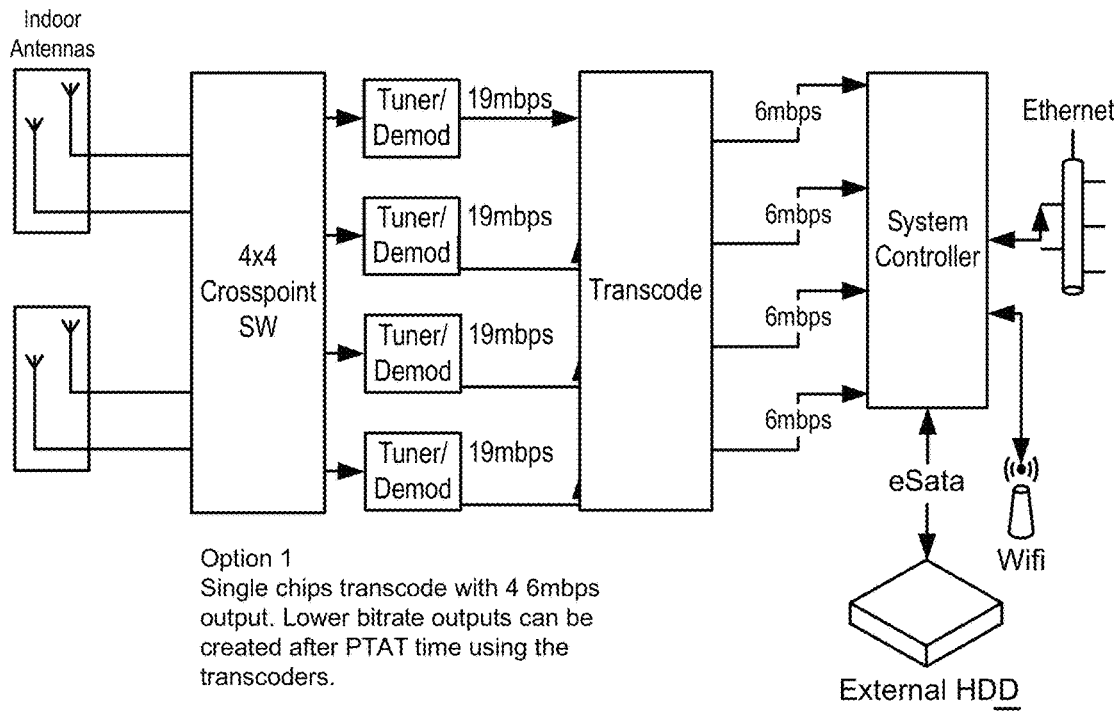
Figure 4C:
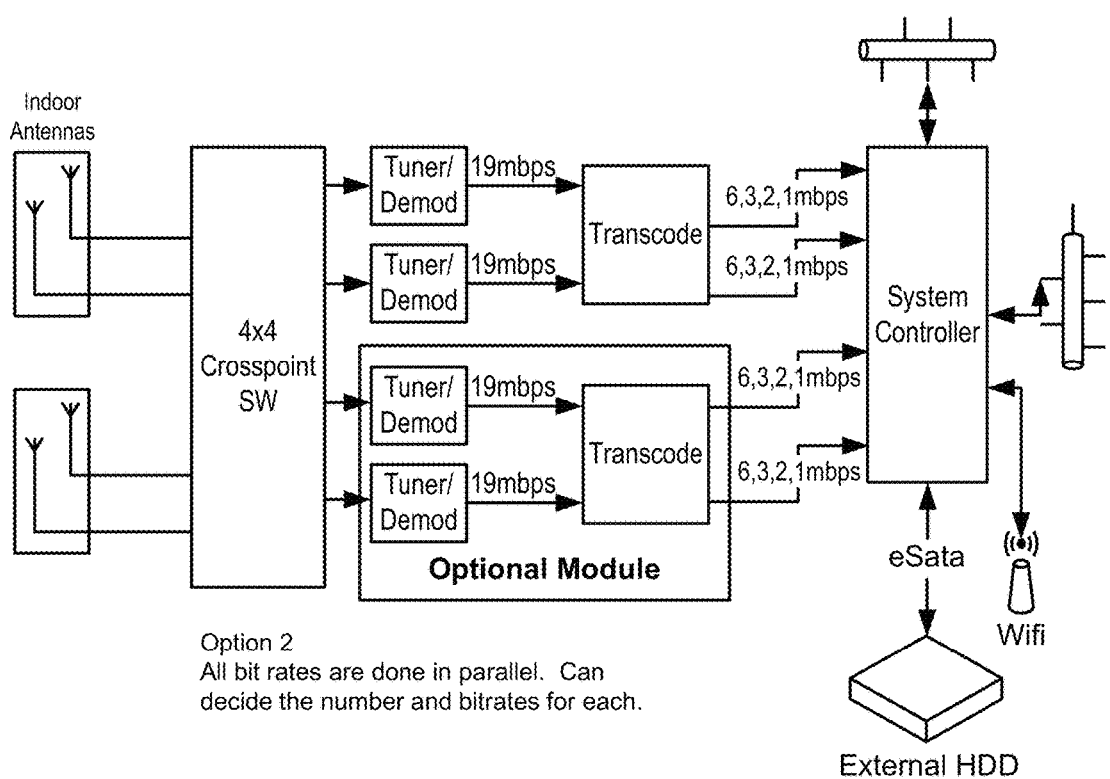

FIGS. 4A-4C are additional block diagrams, having similar basic components as those shown in FIGS. 2-3, illustrating how additional OATCDs may be utilized to scale up transcoding and/or streaming functionality.

FIG. 4A is an embodiment with two OATCDs sharing 4 antennas. Splitters are utilized to allow each OATCD to use any or all of the antennas. OATCDs further include optional modules (shown in this embodiment as installed and not installed), which can add additional transcoding functionality. FIG. 4B shows an embodiment similar to the embodiment shown in FIG. 4A, but with indoor antennas. With all optional units installed, the embodiments shown in FIGS. 4A and 4B can transcode up to 8 channels simultaneously. FIG. 4B also illustrates how OATCD devices can be utilized in a master/slave configuration with a single hard drive shared between both OATCDs. In alternative embodiments, a combination of indoor and outdoor antennas may be used.

FIG. 4C illustrates two more embodiments of an OATCD: Option 1 and Option 2. In Option 1, a high bit rate (6 mbps) transcode is performed to initially create a high bit rate video stream. Subsequently, transcoders can create lower bit rate video stream, using the high bit rate video stream. These additional bit rates can be transcoded, for example, when transcode resources are available, such as in the middle of the night. In Option 2, transcoders perform parallel transcoding, creating multiple video streams with different bitrates (6, 3, 2, and 1 mbps) at the same (or nearly-same) time. These different bit rate video streams can be used for ABR video streaming to different devices. Bit rates commonly used among the various devices can be chosen beforehand to help avoid any further transcoding. That said, additional transcoding can be performed subsequently if yet more video streams of different bit rates need to be created. Video streams having different bit rates can have different resolutions and other characteristics, which can be better suited for different device types and/or connection speeds.

Figure 5:
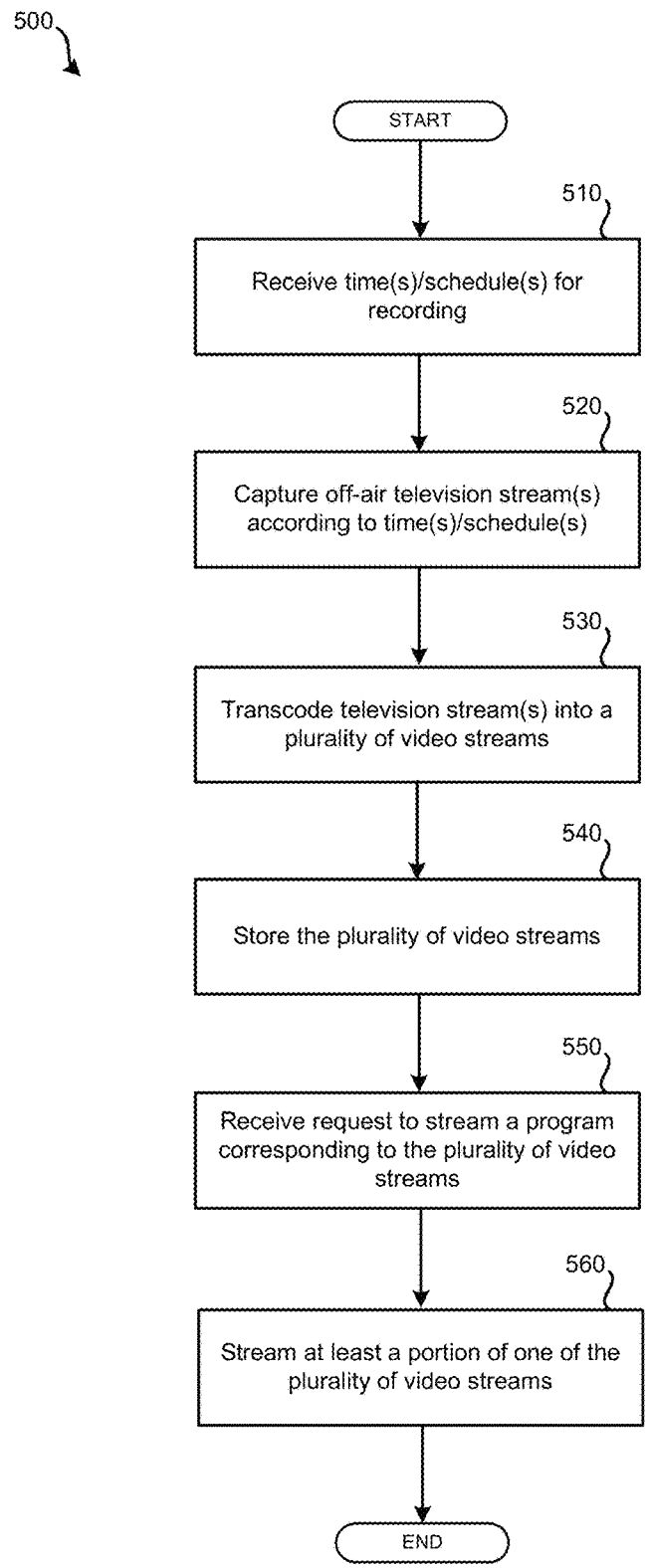
FIG. 5 is a simplified flow diagram of an embodiment of a method for capturing, transcoding, and streaming television content.

FIG. 5 is a simplified flow diagram of an embodiment of a method 500 for capturing, transcoding, and streaming television content. The method 500 may be performed using an OATCD and/or other components of a content streaming system, such as the content streaming system 100 of FIG. 1. Means for performing each step of method 500 can include hardware and/or software components, such as those detailed herein above with regard to FIG. 2, and/or those detailed below in regard to FIG. 6.

At block 510, one or more time(s) and/or schedule(s) are received for recording television programming. The time(s) and/or schedule(s) can be received by an OATCD and generated from user input. For example, in one embodiment, a user can select a program to record on an EPG displayed on a television, tablet, or phone. A television receiver can then communicate a request to record the selected program to a local or remote content manager. The content manager 117 can determine whether an OATCD is capable of recording the selected program from off-air television programming. If so, the content manager provides the times (e.g., start time and end time, pre-designated schedule block, etc.) for recording. Additionally or alternatively, the content manager can provide a recording request to the OATCD, which may utilize local information to determine the proper time(s) and/or schedule(s) for recording.

At block 520, one or more off-air television stream(s) are captured, according to the time(s) and/or schedule(s). As indicated above, capturing off-air television stream(s) can include using a particular antenna by, for example, determining which antenna has the best quality for a particular channel. Such a determination can be made before and/or during the recording. The antenna used can be switched during recording if the signal becomes poor on the initial antenna chosen. This can be done as often as required.

At block 530, the one or more captured television stream(s) are transcoded into a plurality of video streams. Such video streams can have different bit rates to enable subsequent ABR streaming of the recording. At block 540, these video streams are stored. Depending on desired functionality, the video streams may be stored locally with an internal and/or external hard drive (or other memory storage), or it may be stored elsewhere on a network. Other embodiments may store one or more video streams at one or more remote locations (i.e., locations not connected to a local data network).

At block 550, a request to stream a program corresponding to the plurality of video streams is received. This request may originate from user input. For example, in one embodiment, a user may select a recorded program for viewing from a list of recorded programs displayed on a television. The selection can then be transmitted from a television receiver to a content manager, which determines the location of the video streams corresponding to the selected program. If the location is determined to be on an OATCD local to the user, the content manager can provide one or more URLs indicating the location on the OATCD of one or more of the video streams to the television receiver, which can use the one or more URLs to stream the selected program.

At block 560, at least a portion of one of the plurality of video streams is streamed. Streaming techniques may vary. As discussed earlier, ABR streaming techniques may be utilized to provide a video stream to accommodate a particular connection speed and/or device type. A determination of connection speed and/or device type can be made at the onset of streaming and/or periodically while the video is being streamed. Embodiments provided herein can accommodate a wide variety of device types and may allow for simultaneous streaming of a video to multiple device types using different video streams to accommodate each device type.

It should be appreciated that the specific steps illustrated in FIG. 5 provides an example of methods for capturing and streaming off-air television programming. Alternative embodiments may include alterations to the embodiments shown. For example, alternative embodiments may include differing techniques for receiving and/or creating scheduled video stream capture times. Other embodiments may include providing the video streams to a separate device and/or system for storage. Furthermore, additional features may be added or removed depending on the particular applications. One of ordinary skill in the art would recognize many variations, modifications, and alternatives.

Figure 6:
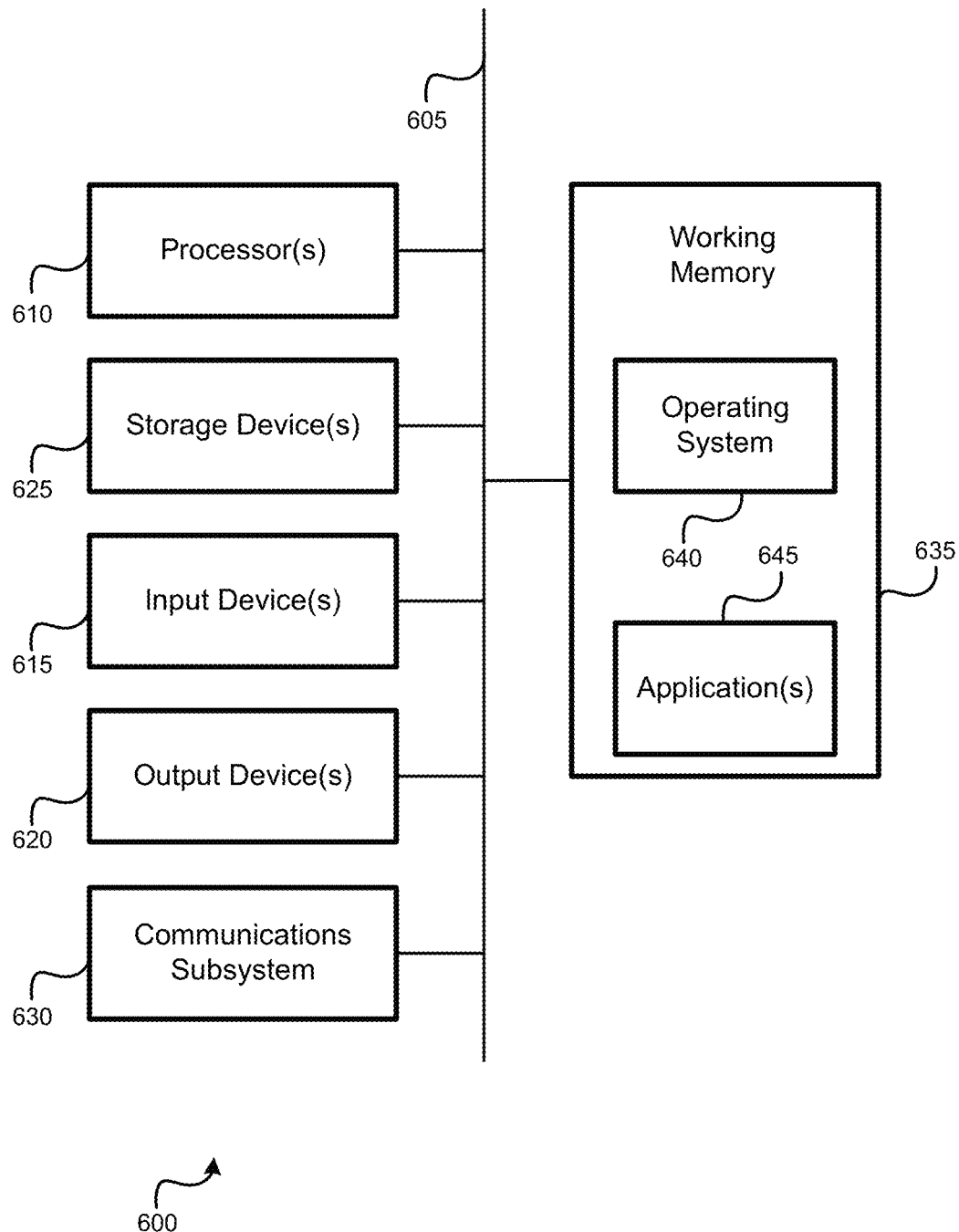
FIG. 6 is a block diagram of an embodiment of a computer system that may be incorporated, in whole or in part, in one or more components of a content streaming system described herein.

FIG. 6 illustrates an embodiment of a computer system. A computer system as illustrated in FIG. 6 may be incorporated, in whole or in part, as part of the previously-described computerized devices, such as television receiver 180, television 190, wireless devices 195 or other devices connected with a router 150, content manager 117, content storage 113, OATCD 160, and/or components described in relation to FIGS. 1-4C. For example, computer system 600 can represent some of the components of the mobile devices and/or the remote computer systems discussed in this application. FIG. 6 provides a schematic illustration of one embodiment of a computer system 600 that can perform the methods provided by various other embodiments. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a mouse, a keyboard, antenna, and/or the like; and one or more output devices 620, which can include without limitation a display device, a printer, and/or the like.

The computer system 600 may further include (and/or be in communication with) one or more non-transitory storage devices 625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device, and/or a chipset (such as a Bluetooth™ device, an 802.11 device and/or a WiFi device, a WiMax device, cellular communication facilities, etc.), and/or the like. The communications subsystem 630 may permit data to be exchanged with a network (such as the network described below, to name one example), other computer systems, and/or any other devices described herein. In many embodiments, the computer system 600 will further comprise a working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 625 described above. In some cases, the storage medium might be incorporated within a computer system, such as computer system 600. In other embodiments, the storage medium might be separate from a computer system (e.g., a removable medium, such as a compact disc, solid-state memory device, etc.), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments described herein. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 625. Volatile media include, without limitation, dynamic memory, such as the working memory 635.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600.

The communications subsystem 630 (and/or components thereof) generally will receive signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a non-transitory storage device 625 either before or after execution by the processor(s) 610.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. An at-home device for receiving and delivering television programming, the at-home device comprising:
   an over-the-air television tuner that receives over-the-air local television broadcasts from an over-the-air antenna installed at a home of a user;
   a memory;
   a wireless communication interface that communicates with a wireless network, the wireless communication interface being distinct from the over-the-air television tuners; and
   one or more processors communicatively coupled with the over-the-air television tuner, the memory, and the wireless communication interface, wherein the one or more processors are configured to:
      perform an initial setup of the at-home device to determine a plurality of over-the-air broadcast television channels that are received using the over-the-air television tuner via the over-the-air antenna at the home;
      provide, via the Internet to a content manager hosted by a remote content provider system, an indication of the plurality of over-the-air broadcast television channels determined during the performed initial setup of the at-home device;

receive a request to transmit a stream of an over-the-air broadcast television channel from the plurality of over-the-air broadcast television channels from the content manager hosted by the remote content provider system based on: (1) the content manager receiving a request from a remote computerized device, and 2) the indication of the plurality of the over-the-air broadcast television channels determined during the performed initial setup of the at-home device;

receive, from the over-the-air antenna via the over-the-air television tuner, an over-the-air broadcast of the requested over-the-air broadcast television channel;

transcode the over-the-air broadcast of the requested over-the-air broadcast television channel into a different video compression format to create a transcoded video stream; and output, via the wireless communication interface, at least a portion of the transcoded video stream to the remote computerized device via the wireless network in response to the request.

2. The at-home device for receiving and delivering television programming of claim 1, wherein the at least the portion of the transcoded video stream output to the remote computerized device is transmitted to the remote computerized device via the Internet.

3. The at-home device for receiving and delivering television programming of claim 1, wherein the one or more processors being configured to transcode the over-the-air broadcast comprises the one or more processors being configured to transcode the over-the-air broadcast of the requested over-the-air broadcast television channel from MPEG-2 to MPEG-4.

4. The at-home device for receiving and delivering television programming of claim 1, wherein the transcoding performed by the one or more processors is performed in real time as the over-the-air broadcast of the requested over-the-air broadcast television channel is received.

5. The at-home device for receiving and delivering television programming of claim 1, wherein the one or more processors being configured to transcode the over-the-air broadcast comprises the one or more processors using adaptive bitrate streaming to adjust a streamed bitrate of the transcoded video stream to respond to network congestion determined via the wireless communication interface.

6. The at-home device for receiving and delivering television programming of claim 1, wherein:

the over-the-air television tuner is configured to be communicatively connected with a plurality of over-the-air antennas that comprises the over-the-air antenna; and the one or more processors is further configured to select the over-the-air antenna from the plurality of over-the-air antennas to use to receive the over-the-air broadcast of the requested over-the-air broadcast television channel based on a signal strength associated with the over-the-air antenna.

7. The at-home device for receiving and delivering television programming of claim 1, further comprising a plurality of over-the-air television tuners that includes the over-the-air television tuner, wherein the one or more processors is further configured to receive a plurality of television channels via the plurality of the over-the-air television tuners at the same time.

8. A method for using an at-home device for receiving and streaming television programming, the method comprising:

performing, by the at-home device, an initial setup of the at-home device to determine a plurality of over-the-air broadcast television channels that are received using an over-the-air television tuner connected with an over-the-air antenna at a home;

transmitting, by the at-home device, via the Internet to a content manager hosted by a remote content provider system, an indication of the plurality of over-the-air broadcast television channels determined during the initial setup of the at-home device;

receiving, by the at-home device, via a wireless communication interface in communication with a wireless network, a request to transmit a stream of an over-the-air broadcast television channel from the plurality of over-the-air broadcast television channels from the content manager based on: (1) the content manager receiving a request from a remote computerized device; and (2) the indication of the plurality of the over-the-air broadcast channels determined during the performed initial setup of the at-home device;

receiving, by the at-home device, from the over-the-air antenna connected with the over-the-air television tuner, an over-the-air broadcast of the requested over-the-air broadcast television channel;

transcoding, by the at-home device, the over-the-air broadcast of the requested over-the-air broadcast television channel into a different video compression format to create a transcoded video stream; and outputting, by the at-home device, via the wireless communication interface, at least a portion of the transcoded video stream to the remote computerized device via the wireless network in response to the request.

9. The method for using the at-home device for receiving and streaming television programming of claim 8, wherein the at least the portion of the transcoded video stream output to the remote computerized device is transmitted to the remote computerized device via the Internet.

10. The method for using the at-home device for receiving and streaming television programming of claim 8, wherein transcoding the over-the-air broadcast comprises transcoding the over-the-air broadcast of the requested over-the-air broadcast television channel from MPEG-2 to MPEG-4.

11. The method for using the at-home device for receiving and streaming television programming of claim 8, wherein transcoding is performed in real time as the over-the-air broadcast of the requested over-the-air broadcast television channel is received.

12. The method for using the at-home device for receiving and streaming television programming of claim 8, wherein transcoding the over-the-air broadcast is performed using adaptive bitrate streaming to adjust a streamed bitrate of the transcoded video stream to respond to network congestion determined via the wireless communication interface.

13. The method for using the at-home device for receiving and streaming television programming of claim 8, further comprising:

selecting, by the at-home device, the over-the-air antenna from a plurality of over-the-air antennas to use to receive the over-the-air broadcast of the requested over-the-air broadcast television channel based on a signal strength associated with the over-the-air antenna.

14. A non-transitory processor-readable medium for an at-home over-the-air reception and streaming device, comprising processor-readable instructions configured to cause one or more processors to:
- perform an initial setup of the at-home over-the-air reception and streaming device to determine a plurality of over-the-air broadcast television channels that are received using an over-the-air television tuner connected with an over-the-air antenna at a home;
- cause to be transmitted, to a content manager via the Internet, an indication of the plurality of over-the-air broadcast television channels determined during the performed initial setup of the at-home over-the-air reception and streaming device, wherein the content manager is hosted remotely by a remote content provider system;
- receive, via a wireless communication interface in communication with a wireless network, a request to transmit a stream of an over-the-air broadcast television channel from the plurality of over-the-air broadcast television channels from the content manager hosted by the remote content provider system based on: (1) the content manager receiving a request from a remote computerized device; and (2) the indication of the plurality of the over-the-air broadcast television channels determined during the performed initial setup of the at-home over-the-air reception and streaming device;
- receive, from the over-the-air antenna connected with the over-the-air television tuner, an over-the-air broadcast of the requested over-the-air broadcast television channel;
- transcode, the over-the-air broadcast of the requested over-the-air broadcast television channel into a different video compression format to create a transcoded video stream; and
- output, via the wireless communication interface, at least a portion of the transcoded video stream to the remote computerized device via the wireless network in response to the request.

15. The non-transitory processor-readable medium of claim 14, wherein the at least the portion of the transcoded video stream output to the remote computerized device is transmitted to the remote computerized device via the Internet.

16. The non-transitory processor-readable medium of claim 14, wherein the processor-readable instructions configure the one or more processors to transcode the requested over-the-air broadcast television channel from MPEG-2 to MPEG-4.

17. The non-transitory processor-readable medium of claim 14, wherein the processor-readable instructions configure the one or more processors to transcode in real time as the over-the-air broadcast of the requested over-the-air broadcast television channel is received.

18. The non-transitory processor-readable medium of claim 14, wherein the processor-readable instructions configure the one or more processors to transcode using an adaptive bitrate technique such that a streamed bitrate of the transcoded video stream can be adjusted to respond to available network bandwidth.

* * * * *